United States Patent [19]

Min et al.

[11] Patent Number: 4,488,094
[45] Date of Patent: Dec. 11, 1984

[54] LINEAR INTEGRATED CIRCUIT FOR DRIVING A D.C. MOTOR WITH RADIO CONTROL

[75] Inventors: Sung K. Min, Incheon; Bang W. Lee, Bucheon; Doo H. Choi, Seoul, all of Rep. of Korea

[73] Assignee: Samsung Semiconductor & Telecommunications Company, Ltd., Rep. of Korea

[21] Appl. No.: 482,411

[22] Filed: Apr. 6, 1983

[30] Foreign Application Priority Data

Oct. 30, 1982 [KR] Rep. of Korea .................. 82-4922

[51] Int. Cl.³ .............................................. H04Q 7/02
[52] U.S. Cl. .................................. 318/16; 340/825.69
[58] Field of Search .................. 318/16; 361/106; 340/825.69, 825.72, 870.28

[56] References Cited

U.S. PATENT DOCUMENTS

| | | | |
|---|---|---|---|
| 3,435,298 | 3/1969 | Atkins et al. | 318/484 X |
| 3,708,720 | 1/1973 | Whitney et al. | 361/106 X |
| 4,143,307 | 3/1979 | Hansen et al. | 318/16 |
| 4,168,468 | 9/1979 | Mabuchi et al. | 180/6.5 X |
| 4,224,762 | 9/1980 | McCaslin | 340/825.72 X |
| 4,275,394 | 6/1981 | Mabuchi et al. | 318/16 X |
| 4,349,986 | 9/1982 | Tsukuda | 318/16 X |
| 4,424,470 | 1/1984 | Finch | 318/6 |

OTHER PUBLICATIONS

C. Harlow, Electronics Industry, vol. 3, No. 10, (Oct. 1977), p. 33.

Primary Examiner—S. J. Witkowski
Assistant Examiner—Bentsu Ro
Attorney, Agent, or Firm—Bacon & Thomas

[57] ABSTRACT

The present invention relates to a linear integrated circuit for driving a d.c. motor with remote radio control comprising an amplifier $B_1$ to amplify the signal transmitted by the transmitter, a peak detector $B_2$ detecting the said signal, a comparator $B_3$ triggered by the d.c. output voltage of the said detector, transistors $Q_1'$, $Q_2'$ of the driving stage circuit $B_4$, which can invert the driving direction of the d.c. motor by on or off operation of the said transistors in accordance with the output voltage of the said comparators, a voltage regulator circuit $B_5$ and a thermal protection circuit $B_6$ stabilizing the said transistors thermally.

4 Claims, 6 Drawing Figures

LINEAR INTEGRATED CIRCUIT FOR DRIVING A D.C. MOTOR WITH RADIO CONTROL

The present invention relates to a linear integrated circuit for driving a d.c. motor with radio control and is particularly concerned with a linear integrated circuit for reversing the rotational direction of the d.c. motor with the input signal controlled by radio.

Figure 1:
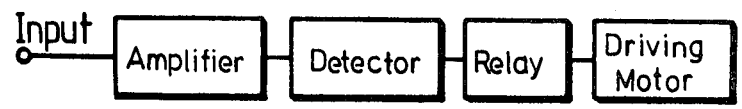
Figure 2:
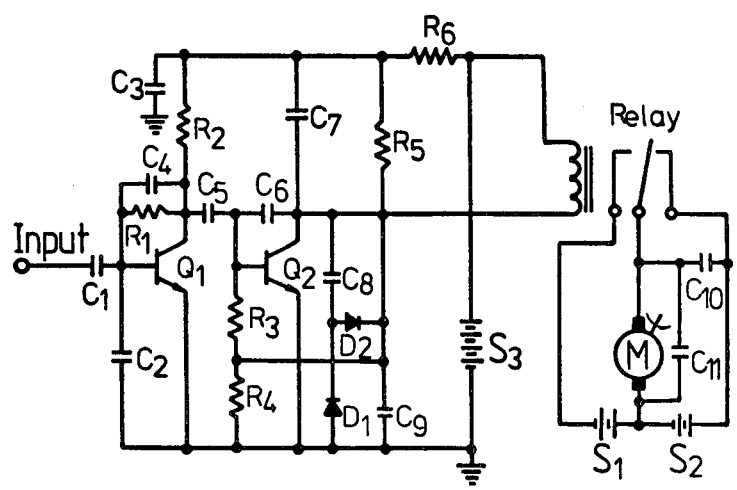

The prior driving circuit for a radio controlled d.c. motor was provided with a circuit for reversing the rotational direction of the d.c. motor through the operation of a relay. After the signal transmitted by a transmitter was received, the said signal was amplified by an amplifier and the said amplified signal was detected by a detector, as illustrated in FIG. 1. FIG. 2 is the prior circuit diagram embodying FIG. 1. The signal transmitted by a transmitter is supplied at the input stage INPUT and the d.c. component of the said signal is blocked by the blocking capacitor $C_1$ and the a.c. signal is amplified by the transistor $Q_1$. The said amplified signal is detected by the detector composed of transistor $Q_2$ and capacitor $C_9$. The current supplied by the said detected voltage and the power supply voltage $S_3$ makes the relay operate.

Because the prior circuit for driving the d.c. motor has been composed of individual devices such as transistors, relays, power supply, resistors and capacitors, it has been very difficult to miniaturize the circuit with the said devices. Because the bad contact of such relays results in trouble and the cost of the relay is high, it has been very difficult to use the circuit for a long time and lower its price.

It is the object of the present invention to provide a miniature linear integrated circuit for reversing the driving direction of a d.c. motor with one external battery pack. It is another object of the present invention to provide a linear integrated circuit which can be operated with thermal stability and the price of which is very cheap.

According to the invention there is provided a linear integrated circuit for driving a d.c. motor with radio control, and for reversing the rotational direction of the d.c. motor on receiving a signal from the transmitter, comprising an amplifier to amplify an input signal received from the transmitter, a detector arranged to detect the amplified signal, a comparator coupled to the detector and arranged to produce a signal representing the rotational direction, a driving stage circuit coupled to the comparator for driving the d.c. motor, a voltage regulator circuit for supplying stabilised voltage to the rest of the circuit, and a thermal protection circuit for thermally stabilising the driving stage circuit. Preferably the comparator is triggered by a d.c. output voltage of the said detector, the driving stage circuit includes transistors which can invert the driving direction of the d.c. motor by on or off operation of said transistors in accordance with the output voltage of the said comparator, and the thermal protection circuit stabilizes the said transistors thermally.

Figure 3:
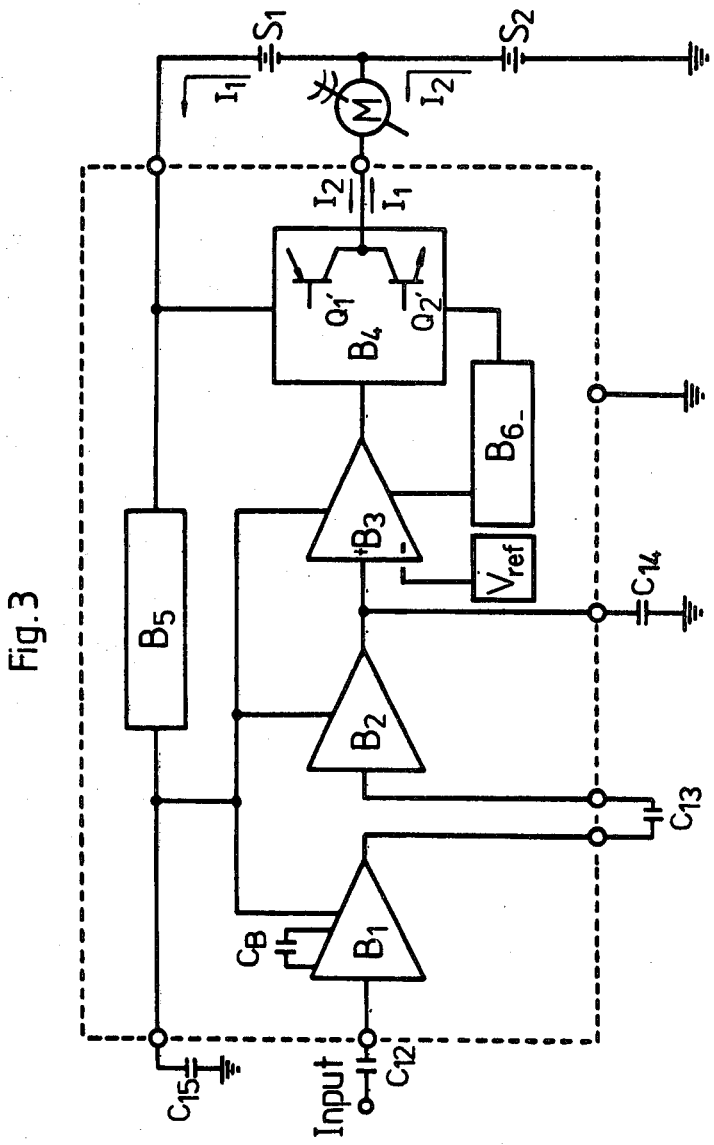
Figure 4:
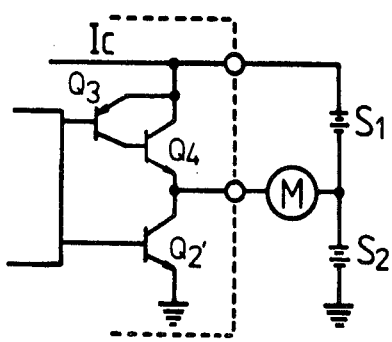
Figure 5:
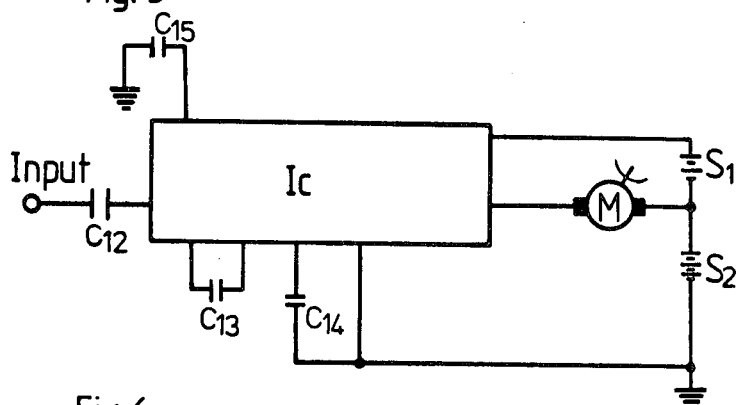
Figure 6:
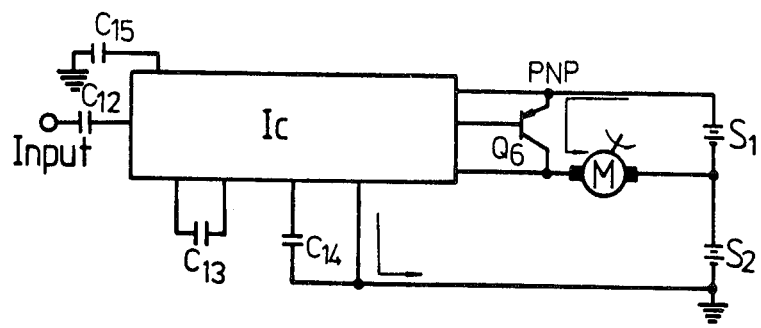

Certain embodiments of the invention will now be described by way of example and with reference to the accompanying drawings, in which:

FIG. 1 is a block diagram of the prior circuit for driving a d.c. motor;
FIG. 2 is a circuit diagram of the circuit of FIG. 1;
FIG. 3 is a block diagram of a linear integrated circuit according to the present invention;
FIG. 4 is a circuit diagram of one embodiment of the driving stage circuit according to the present invention; and
FIGS. 5 and 6 are circuit diagrams showing one embodiment of the linear integrated circuit for driving a d.c. motor.

Referring to the attached drawings, FIG. 3 is a block diagram of a linear integrated circuit according to the present invention, wherein $B_1$ is an amplifier, $B_2$ a detector, $B_3$ a comparator, $B_4$ a driving stage for driving the d.c. motor, $B_5$ a power supply regulator, $B_6$ a thermal protection circuit, $C_{12}$-$C_{15}$ and $C_B$ capacitors, $Q_1'$ and $Q_2'$ power transistors, M a d.c. motor and $S_1$-$S_2$ power supplies. When a signal transmitted from a wireless transmitter is supplied to the input stage, the blocking capacitor $C_{12}$ blocks the d.c. component of the said signal and thereby only the a.c. component drives into the amplifier $B_1$ and the amplified signal is output. However, it may be assumed from a design standpoint that the transmitted radio the input terminal of the amplifier $B_1$, may erringly cause the motor M to change its direction of rotation. It is also possible that extraneous noise may be received and detected by this circuit in FIG. 3 from sources other than the wireless transmitter (not shown).

Therefore, to counteract potential erroneous operation of the circuit resulting from incident noise, a feedback capacitor $C_B$ is connected to the amplifier $B_1$ in a manner well known in the art. This capacitor $C_B$ thus functions as a band-pass filter for genuine signals received and input to amplifier $B_1$ with a frequency below that of suspected potential noise components. Accordingly, the value of capacitor $C_B$ or equivalent feedback-filter network, may be chosen to tailor or narrow the upper limit of the amplifiers $B_1$ frequency response (effective bandwidths). The said signal amplified by amplifier $B_1$ drives into the peak detector composed of differential amplifier $B_2$ and capacitor $C_{14}$ through the d.c. blocking capacitor $C_{13}$.

When the said signal amplified from the amplifier $B_1$ is supplied to amplifier $B_2$, capacitor $C_{14}$ is charged by the output current of the amplifier $B_2$ to the peak value of the positive input signal of the said differential amplifier $B_2$. When the said positive input signal falls below the said peak value, the output of capacitor $C_{14}$ continues the said charged voltage for some time. Thus the capacitor $C_{14}$ gets charged to the most positive value of the input. By such operation, the peak detected d.c. input voltage is supplied to the comparator $B_3$. When the said detected d.c. voltage is applied at the input of the comparator $B_3$, the said comparator $B_3$ is triggered and inverts its output voltage. In other words, when the detected d.c. voltage supplied to the comparator $B_3$ becomes higher than the threshold voltage input to the negative terminal $V_{ref}$, the output voltage of comparator $B_3$ changes from low voltage (nearly 0 volt) into high positive voltage and the rotational direction of the d.c. motor becomes positive as described below. When the detected d.c. voltage supplied to the comparator $B_3$ becomes lower than the threshold voltage of $V_{ref}$, the output voltage of comparator $B_3$ changes from the said positive voltage into the low voltage (nearly 0 volt) and the rotational direction of the d.c. motor becomes negative. Because of the preference that this invention operate with these two voltage thresholds in order to accommodate the two corresponding motor rotations, it is appropriate that a hysteresis-type voltage difference of about 0.2 volt exist between these two thresholds in order to prevent the misoperation of the comparator $B_3$ by either an unfiltered noise component or the ripple variation of the peak-detected d.c. input voltage. In the preferred embodiment of FIG. 3, the comparator $B_3$ is a type wherein the hysteretic characteristics are such that a threshold is created in the case of increasing input voltage and a threshold is created in the case of decreasing input voltage. When the output voltage of comparator $B_3$ is applied at the input of the driving stage circuit $B_4$, the rotational direction of the d.c. motor becomes positive or negative by the turning on or off of the transistotr $Q_1'$ or $Q_2'$ for driving the d.c. motor. When the output voltage of the comparator $B_3$ is changed from the low voltage (0 volt) to the positive voltage by the triggering voltage, NPN transistor $Q_2'$ turns on and PNP transistor $Q_1'$ turns off. Hence, the current flows in the direction $I_2$ through the power supply $S_2$ and the rotational direction of the d.c. motor M becomes positive. On the other hand, when there is no signal broadcasted by the wireless transmitter, and thus no genuine motor-control signal incident at the inputs of amplifier $B_1$ nor comparator $B_3$, the output voltage of the comparator $B_3$ is reversed from the said positive voltage into the low voltage (0 volt) and the NPN transistor $Q_2'$ turns off and the PNP transistor $Q_1'$ turns on. Hence, the current flows in the direction $I_1$ through the power supply $S_1$ and the rotational direction of the d.c. motor M becomes negative.

Voltage regulator circuit $B_5$ stabilizes the operation of the amplifier $B_1$, detector $B_2$, comparator $B_3$ and thermal protection circuit $B_6$ against power supply variations and protects the operation of the circuit from the noise and ripple generated in driving the d.c. motor. The smoothing capacitor $C_{15}$ stabilizes the operation of the circuit even more. Thermal protection circuit $B_6$ is connected in parallel with the driving stage circuit $B_4$ and the comparator $B_3$. If the temperature of the driving stage circuit $B_4$ increases above the reference temperature, thermal protection circuit $B_6$ detects it and cuts off the operation of the said driving stage circuit $B_4$. After that, if the temperature of the said driving stage circuit $B_4$ decreases below the reference temperature, the said driving stage circuit $B_4$ operates again. Therefore, as the driving stage current is cut off at the time of operation of the thermal protection circuit, the consumption of the power supply decreases and the driving stage circuit $B_4$ operates at a safe temperature.

FIG. 4 illustrates a second embodiment of the present invention disclosed to facilitate the fabrication of part of the transistor structure in the driving stage circuit $B_4$ (and hence, miniaturization), wherein the composite connection of a PNP transistor $Q_3$ and an NPN transistor $Q_4$ takes the place of the PNP transistor $Q_1'$ in FIG. 3. When the base of the PNP transistor $Q_3$ becomes low voltage (nearly 0 volt), transistor $Q_3$ conducts and also the NPN transistor conducts. Therefore the composite connection of PNP transistor $Q_3$ and NPN transistor $Q_4$ has the same operation as PNP transistor $Q_1'$ in FIG. 3.

FIG. 5 shows the circuit for connecting the linear integrated circuit of the present invention with external components.

FIG. 6 shows an example for driving the d.c. motor via the external connection of a PNP power transistor $Q_6$. In the case of the composite connection of PNP transistor $Q_3$ and NPN transistor $Q_4$ its saturation voltage is high and it makes the d.c. motor driving current low. Hence the d.c. motor driving current is increased by the connection of PNP power transistor $Q_6$. The base of transistor $Q_6$ and that of composite transistor $Q_3$ and $Q_4$ are connected with the current source and some other circuitry inside the IC and the emitter of transistor $Q_6$ is connected with that of transistor $Q_3$ and the collector of transistor $Q_4$. The collector of transistor $Q_6$ is connected with that of transistor $Q_2'$. When the base of transistor $Q_6$ is connected, the current flow path of the current sources is changed from the base of composite transistor $Q_3$ and $Q_4$ to that of transistor $Q_6$ and the composite transistor $Q_3$ and $Q_4$ is not operated.

The circuit of the present invention is more miniature than the prior d.c. motor driving circuit and has thermal stability and requires a smaller power supply.

Although the invention has been described in its preferred form with a certain degree of particularity, it is to be understood that the present disclosure of the preferred form may be changed in the details of construction and the combination and arrangement of parts without departing from the scope of the invention as hereinafter claimed.

We claim:

1. A linear integrated circuit for a motorized receiver unit which receives from a transmitter unit certain radio signals for driving and for reversing the rotational direction of the d.c. motor of said motorized receiver unit, wherein said linear integrated circuit is powered from an external power supply associated with said motorized receiver unit and includes the following components:

(a) an amplifier connectable to the output of the front-end (carrier receiver) section of said motorized receiver unit for amplifying its input signal, which is the transmitted motor command signal relating to rotational direction;
   (b) a peak detector connected to the output of said amplifier and arranged to respond to the peak amplitude of the amplified input signal;
   (c) a comparator coupled to the output of said peak detector and arranged to produce one or two signals corresponding to the direction of rotation of said d.c. motor;
   (d) a driving stage circuit coupled to and responsive to said comparator so as to drive said d.c. motor in one direction or the other;
   (e) a voltage regulator circuit connected to said external power supply and further connected to each of the above components of said linear integrated circuit for supplying stabilized voltage thereto; and
   (f) a thermal protection circuit connecting in-parallel the comparator circuit and the driving stage circuit so as to stabilize the operation of the transistors in the latter.

2. A linear integrated circuit as claimed in claim 1 wherein the driving stage comprises a PNP transistor and an NPN transistor mutually connected in inverter fashion.

3. A linear integrated circuit as claimed in claim 2 wherein the PNP transistor of said driving stage circuit consists of a composite PNP/NPN transistor.

4. A linear integrated circuit as claimed in claim 1 or 3 wherein an individual, discrete PNP power transistor is connected with said driving stage circuit.

* * * * *